US012754385B2

(12) United States Patent
Fanning et al.

(10) Patent No.: US 12,754,385 B2
(45) Date of Patent: Oct. 6, 2026

(54) FIBER CONNECTOR BULKHEAD ADAPTER WITH SHROUD FOR PROTECTING HIGH-POWER FIBER

(71) Applicant: nLIGHT, Inc., Camas, WA (US)

(72) Inventors: C Geoffrey Fanning, Portland, OR (US); Reese R. Siegel, Vancouver, WA (US); Aaron Ludwig Hodges, La Center, WA (US)

(73) Assignee: nLIGHT, Inc., Camas, WA (US)

( * ) Notice: Subject to any disclaimer, the term of this patent is extended or adjusted under 35 U.S.C. 154(b) by 280 days.

(21) Appl. No.: 18/590,336

(22) Filed: Feb. 28, 2024

(65) Prior Publication Data

US 2024/0418949 A1 Dec. 19, 2024

Related U.S. Application Data

(60) Provisional application No. 63/508,479, filed on Jun. 15, 2023.

(51) Int. Cl.
*G02B 6/42* (2006.01)
*G02B 6/36* (2006.01)

(52) U.S. Cl.
CPC ......... *G02B 6/4296* (2013.01); *G02B 6/3624* (2013.01); *G02B 6/423* (2013.01); *G02B 6/4269* (2013.01); *G02B 6/4292* (2013.01); *G02B 6/4246* (2013.01); *G02B 2006/4297* (2013.01)

(58) Field of Classification Search
CPC ................ G02B 6/3825; G02B 6/3897; G02B 2006/4297; G02B 6/4296
See application file for complete search history.

(56) References Cited

U.S. PATENT DOCUMENTS

| | | | | |
|---|---|---|---|---|
| 4,904,035 A * | 2/1990 | Heckmann | G02B 6/4204 385/31 |
| 6,948,862 B2 | 9/2005 | Brown | |
| 8,724,945 B2 * | 5/2014 | Gapontsev | H01S 3/06704 385/38 |
| 10,209,453 B1 | 2/2019 | Hsia et al. | |
| 2004/0114873 A1 * | 6/2004 | Alexeev | G02B 6/4226 385/52 |
| 2005/0196108 A1 * | 9/2005 | Brown | G02B 6/3813 385/39 |
| 2013/0011102 A1 * | 1/2013 | Rinzler | G02B 6/3818 385/94 |
| 2021/0048586 A1 * | 2/2021 | Altshuler | A61N 5/06 |

(Continued)

FOREIGN PATENT DOCUMENTS

| | | |
|---|---|---|
| CN | 209167595 U * | 7/2019 |
| EP | 3640691 A2 | 4/2020 |

OTHER PUBLICATIONS

Liao, machine translation of CN 209167595-U, Jul. 26, 2019. (Year: 2019).*

(Continued)

*Primary Examiner* — Michelle R Connelly
(74) *Attorney, Agent, or Firm* — Wiley Rein LLP

(57) ABSTRACT

A fiber connector bulkhead adapter for coupling a fiber connector to bulkhead optics is configured to inhibit back reflections from damaging a laser system. The adapter includes a bore sized to receive a fiber ferrule of a fiber connector, a mounting base having a centrally located shroud, and an aperture between the end of the bore and the shroud.

14 Claims, 11 Drawing Sheets

(56) References Cited

U.S. PATENT DOCUMENTS

| | | | | |
|---|---|---|---|---|
| 2021/0157064 | A1 | 5/2021 | Gaal et al. | |
| 2023/0101488 | A1 | 3/2023 | Brown et al. | |
| 2023/0168436 | A1 * | 6/2023 | Logunov .............. | G02B 6/3826<br>385/60 |

OTHER PUBLICATIONS

International Search Report and Written Opinion received for PCT Application No. PCT/US2024/017695, mailed on Jun. 17, 2024, 11 pages.

* cited by examiner

FIBER CONNECTOR BULKHEAD ADAPTER WITH SHROUD FOR PROTECTING HIGH-POWER FIBER

CROSS-REFERENCE TO RELATED APPLICATIONS

This application relies on and claims priority to U.S. Provisional Patent Application Ser. No. 63/508,479, filed on Jun. 15, 2023, the entirety of which is incorporated herein by reference.

FIELD OF THE INVENTION

This application relates generally to fiber optic connector adapters and, more particularly to fiber connector bulkhead adapters.

BACKGROUND OF THE INVENTION

A common method of interfacing to and from optical fibers is through a connector. One specific example standard of such a connector is FC. FC is an acronym for ferrule connector or fiber channel. An FC connector is a fiber-optic connector with a threaded body, typically designed for use in high-vibration environments. It is commonly used with single-mode, multi-mode, and polarization-maintaining optical fibers. FC connectors are used in various applications such as datacom, telecommunications, measurement equipment, and lasers.

There are several grades of polish for an FC connector. An FC connector may be designated as an FC physical contact (FC/PC), an FC super polish contact (FC/SPC), or an FC ultra polish contact (FC/UPC). Higher grades of polish may result in less insertion loss and less back-reflection of the light in the fiber from the connector end-face. Another type of FC connector is an angle-polished connection, typically designated FC/APC (for Angled Physical Contact).

FC connectors may be coupled to a variety of receptacles used to mate two fibers or fix access to the end face of a single fiber. An example receptacle for an FC/APC connector having so-called SM05 threads is an FC/APC to SM05 fiber adapter available from Thorlabs, Inc. of Newton, New Jersey. Where the connector emits to free space (i.e., no physical contact), it is called an FC/A.

To protect the fiber laser from back-reflection, some attempts have been made to use an optical isolator. That approach is expensive and not necessarily optimized for relatively high power, wavelengths, and beam parameters of thulium fiber lasers (TFL).

SUMMARY OF THE INVENTION

Disclosed is a fiber connector bulkhead adapter to enable users to mate a fiber laser to a free-space optical system. The disclosed adapter has an internal shroud configured to protect a fiber ferrule and anchor materials between the ferrule and fiber from reflected light in a high-power laser system. The disclosed techniques protect a high-power fiber laser from back-reflected light coming from an optical system to which the fiber laser is coupled. The protection is provided by an optomechanically robust mechanical aperture that allows emission of the laser light while blocking reflected light from sensitive parts of the laser output.

The adapter has a precision bore to allow easy insertion of the fiber optic connector ferrule with precise alignment to a precise aperture machined in the end face of the adapter. The aperture is sized to be smaller than the cladding glass of the fiber face and larger than the emission area of the angled (i.e., polished or cleaved) fiber face. The aperture diameter and its position are made sufficiently precise, relative to the concentricity of the fiber core in the fiber optic connector ferrule, such that unobstructed emission is ensured while shrouding of reflected light of the outside diameter of the glass clad of the fiber is also ensured. The adapter itself is made from a robust and thermally conductive material to reject heat through a combination of reflection and diffusion of absorbed power so as to withstand reflected light without causing excessive heating of the fiber optic ferrule and its contents. The disclosed fiber optic connector bulkhead adapter may be used to replace generic adapters and still provide a stable mechanical mount to connect the fiber laser output to a user's optical system.

In one aspect, a fiber connector bulkhead adapter for coupling a fiber connector to bulkhead optics is designed to inhibit back reflections from damaging a laser system. The adapter includes a bore sized to receive a fiber ferrule of a fiber connector, the fiber ferrule for holding an optical fiber, the optical fiber having a core and a cladding at an end face of the fiber ferrule, and the end face having at least a portion that confronts an end of the bore, a mounting base defining a shroud, and an aperture between the end of the bore and the shroud, the aperture having a diameter that is sized such that it does not occlude a beam diameter of a beam emitted from the core when the core is positioned at its maximum central alignment tolerance, and it shrouds areas of the fiber ferrule beyond the cladding.

The fiber connector bulkhead adapter may also include the shroud formed from a depressed region in the mounting base.

The fiber connector bulkhead adapter may also include a fiber end face angle to avoid core coupled end face reflections.

The fiber connector bulkhead adapter may also include the mounting base having a flange that acts as a heat sink for transferring heat to a bulk optics housing. The fiber connector bulkhead adapter may also include the heat sink is copper.

The fiber connector bulkhead adapter may also include the shroud having a conical reflector.

The fiber connector bulkhead adapter may also include the conical reflector having oblique-angled sidewalls to avoid corner-cube reflectance.

The fiber connector bulkhead adapter may also include the conical reflector having a surface treatment to reduce absorbed power.

The fiber connector bulkhead adapter may also include the surface treatment being a gold plating.

The fiber connector bulkhead adapter may also include the surface treatment being a surface texture to diffuse reflected light.

The fiber connector bulkhead adapter may also include an adapter angle to set the emission perpendicular to the mounting base.

In another aspect, reducing heat build-up in a laser system entails mounting the fiber connector bulkhead adapter to a housing of an FFC and coupling the fiber connector to the fiber connector bulkhead adapter. The technique may further include directing a fan toward the housing and the fiber connector bulkhead adapter. The technique may further include actuating a liquid cooling system to cool the housing and the fiber connector bulkhead adapter.

The foregoing and other objects, features, and advantages will become more apparent from the following detailed description, which proceeds with reference to the accompanying figures, which may not be drawn to scale.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF EMBODIMENT(S) OF THE INVENTION

Figure 1:
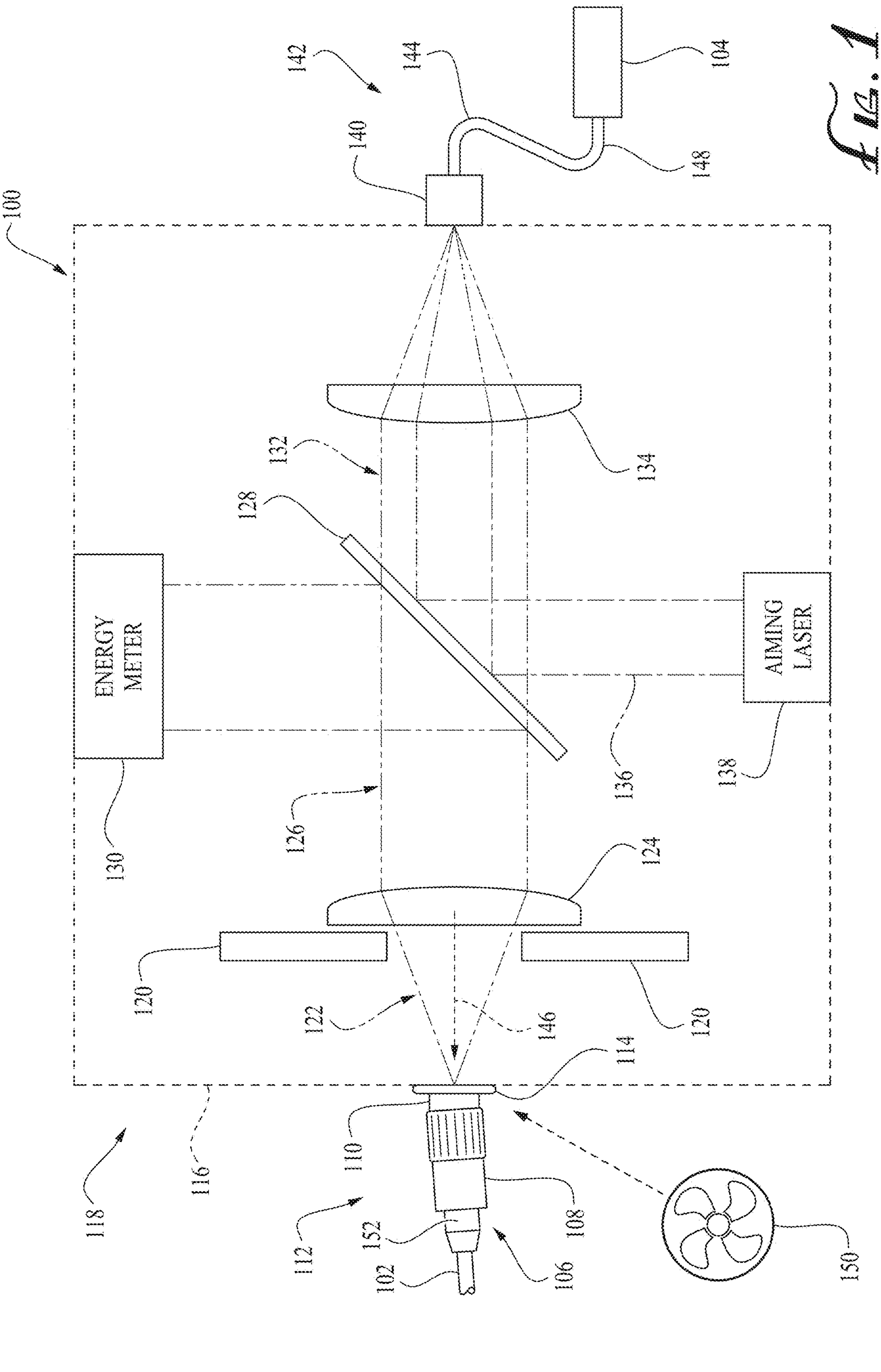
FIG. 1 is a block diagram of a high-power laser system, which includes an FC-to-bulkhead adaptor assembly, according to one embodiment.

FIG. 1 shows an example of a high-power laser system 100 for surgical applications. In this example, high-power laser system 100 includes thulium fiber laser (TFL) output fiber 102 (also called a transport fiber). TFL output fiber 102 has a 1,940 nm wavelength and power designed for urology or other medical applications. For instance, in urology, thulium lasers can be used for the excision of tumors of the urethra, bladder, ureter, or kidneys. Accordingly, FIG. 1 shows high-power laser system 100 includes a laser surgical instrument 104, such as an endoscopic lithotrite, that directs a high-power laser spot onto tissue. In some embodiments, the output power is in the range of 100 W-250 W average power (continuous wave), with peak power in the range of 625 W-1.2 kW. Pulsed power output is also available in the range of 75 W-125 W average power.

TFL output fiber 102 has its distal end 106 terminated inside an FC/A connector 108. FC/A connector 108 is mechanically coupled to an FC/A-to-bulkhead adapter 110, which is described in more detail later with reference to FIG. 2 and FIG. 5. Collectively, FC/A connector 108 and FC/A-to-bulkhead adapter 110 are referred to as an FC-to-bulkhead adaptor assembly 112.

FC/A-to-bulkhead adapter 110 has a mounting base 114 that confronts and is fastened to an exterior surface of a housing 116 for a fiber-to-fiber coupler (FFC) 118. In some embodiments, mounting base 114 is bolted, welded, or screwed directly to housing 116.

FFC 118 includes a safety shutter 120, which in some embodiments acts as an aperture to block divergent laser light from a laser emission 122 of TFL output fiber 102. It also optionally blocks some reflected light (not shown), in some embodiments. When actuated, safety shutter 120 moves into the optical path to block all light and protect a patient.

FFC 118 includes a collimating lens 124 that receives laser emission 122 and generates from it a collimated laser beam 126. Collimated laser beam 126 is directed to a dichroic mirror 128 that splits a portion of collimated laser beam 126 and directs it toward an energy meter 130 for monitoring the total laser power output based on the fraction of the power applied to energy meter 130. A remaining portion 132 of the power of collimated laser beam 126 is directed to a focus lens 134. Dichroic mirror 128 also directs a second beam 136 (e.g., a visible green laser) from an aiming laser 138 to focus lens 134 so that a visible low-power spot can provide an aiming target. Focus lens 134 refocuses portion 132 and second beam 136 so that they are launched into a delivery connector 140.

Laser surgical instrument 104, in some embodiments, is part of a single-use disposable assembly 142 that includes delivery connector 140 and a delivery fiber 144. Delivery fiber 144 then acts to guide the laser power to laser surgical instrument 104.

TFL output fiber 102 is designed to be insensitive to reflections into the fiber cladding (e.g., by including a cladding light stripper and heatsink, not shown) within the 0.48 numerical aperture guided by the glass cladding of the double clad fiber. Nevertheless, the design of TFL output fiber 102 includes organic buffer material sheathing the fiber up to the emission end face and this material is known to be delicate under direct illumination of laser light.

Inspection of failures in conventional systems have shown considerable damage to connector surfaces in close proximity to the fiber emission surface. For example, even in sufficiently clean operating environments (i.e., indicating that the fiber is not damaged by foreign contamination), the present inventors recognized that TFL output fibers have experience damage. The damage was observed even when organic material was removed from the portion of the glass fiber end exposed by protrusion from a stainless-steel ferrule in which the fiber end is anchored.

When in use, various optical components downstream of FC/A-to-bulkhead adapter 110 have the tendency to cause back-reflected light 146. For instance, laser surgical instrument 104 has one or more internal interfaces acting as partial reflectors 148 such that back-reflected light 146 could reach distal end 106. It was hypothesized that, in conventional systems, back-reflected light 146 reaches the sensitive fiber buffer. And at high power, back-reflected light 146 causes vaporization and deposition onto the fiber output face, thus providing contamination of the output face to start the failure process, resulting in the failure of high-power laser system 100. Accordingly, the present inventors determined that, in the absence of the disclosed techniques, back-reflected light 146 would damage distal end 106 of TFL output fiber 102 as the light reaching surfaces of the fiber ferrule leads to sufficient heating of the ferrule and organic materials (e.g., epoxy resin potting or optically inert gel) used to anchor the fiber in the ferrule such that the materials vaporize, contaminate the fiber emission end face, and start the contamination failure mechanism.

To prevent excessive heating, high-power laser system 100 includes a fan 150 that cools mounting base 114 and adjacent surfaces of housing 116. FC/A-to-bulkhead adapter 110 also includes internal features that are described later with reference to FIG. 2. In experimental measurements of temperatures at boot 152, a significant reduction in heat was observed. Skilled persons will appreciate that other types of cooling systems may be used as well, such as, for example, liquid cooling (e.g., water) to cool FC-to-bulkhead adaptor assembly 112 and surrounding surfaces of housing 116.

Figure 2:
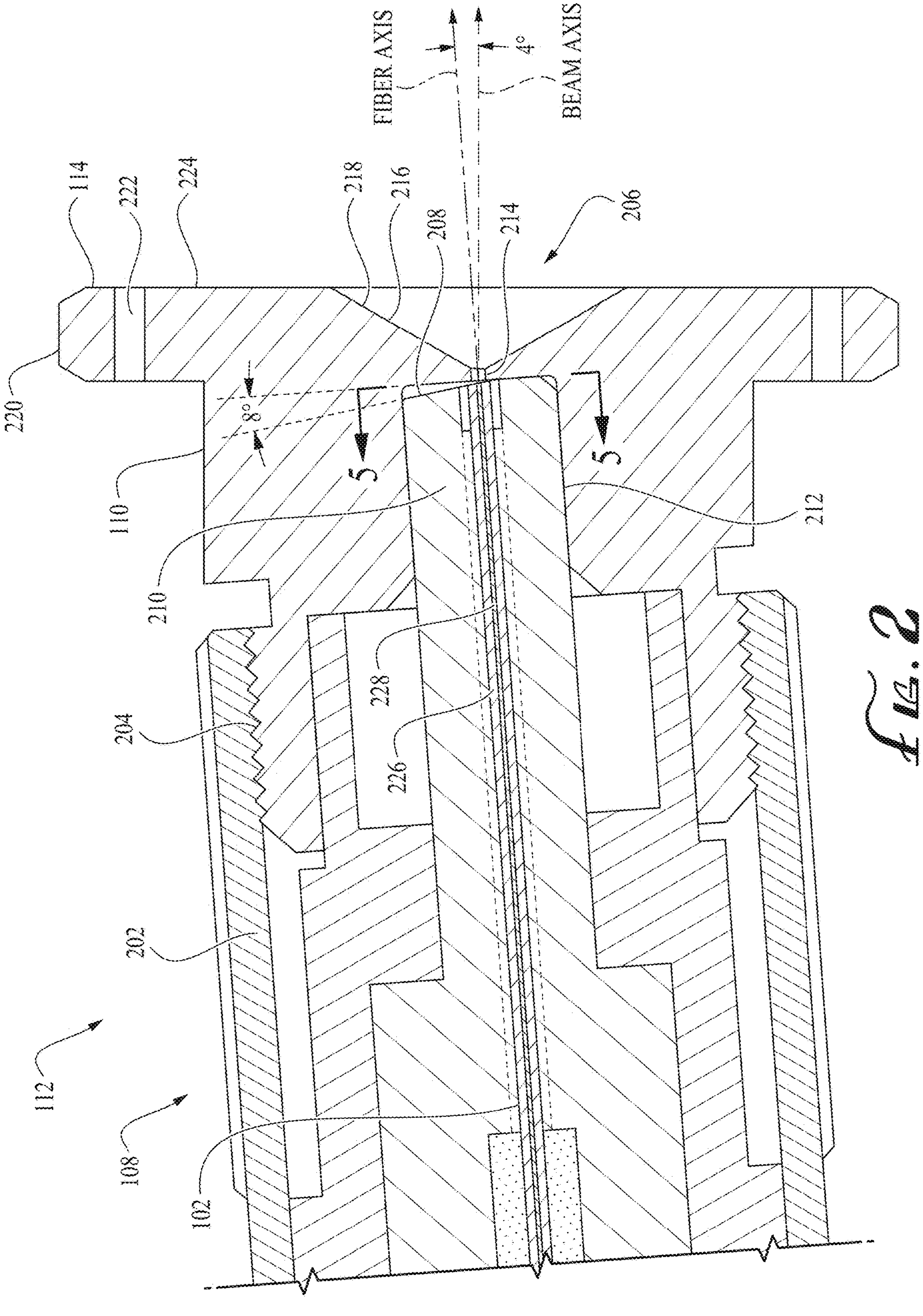
FIG. 2 is a cross-sectional view of a fragment of the FC-to-bulkhead adaptor assembly of FIG. 1, showing in greater detail an FC/A-to-bulkhead adapter configured to reject back-reflected light.

FIG. 2 shows in greater detail FC-to-bulkhead adaptor assembly 112 when a coupling nut 202 (M8×0.75) is fastened to a screw barrel 204 of FC/A-to-bulkhead adapter 110. Although this example is for an FC-A type of connector, the features show and described in this disclosure could be incorporated into an SMA-sized ferrule, an LC ferrule, or any non-standard ferrule. For instance, an F-SMA may have a 3.175 mm hard metal ferrule. An LC ferrule uses a 1.25 mm diameter ceramic ferrules with PC end-face.

FC/A-to-bulkhead adapter 110 includes a shroud 206 that is formed by a depressed region of mounting base 114. Shroud 206 is configured to conceal sensitive areas around TFL output fiber 102 at an end face 208 so as to reduce an amount of back-reflected light 146 (FIG. 1) from reaching those heat-sensitive materials. Examples of sensitive materials include a fiber ferrule 210 or optional epoxy resin (not shown) used for potting fiber ferrule 210 inside a ferrule bore 212.

As noted above, shroud 206 acts to cover or envelop sensitive areas of TFL output fiber 102 so as to conceal from view the portion of the fiber optic exit connector that is delicate under severe illumination while leaving exposed the portion of the fiber optic that is robust under severe illumination, which is exposed to allow emission of the laser beam. In the example of FIG. 2, shroud 206 includes a centrally located aperture 214 between ferrule bore 212 and a conical reflector 216. FIG. 2 shows confronting sidewalls 218 of conical reflector 216 are non-perpendicular. In other words, the angle between confronting sidewalls 218 is oblique-angled (acute or obtuse) so that back-reflected light 146 cannot be corner-cube reflected back toward laser surgical instrument 104 (FIG. 1). In the example of FIG. 2, the angle is about 120°.

In other embodiments, the shroud need not be formed by a depressed region. For instance, the thickness of a mounting base may be sufficiently thin so that shroud includes an aperture with no depression. In other embodiments where thicker material is desired for mechanical support, a mounting base may be thicker, in which case the aperture is wider or tapered for the beam as it diverges as it propagates relative to the length of the thicker material. Furthermore, in some other embodiments, a shroud may include domed or other shapes instead of a conical reflector 216.

FIG. 2 also shows additional details of mounting base 114. In this example, a flange 220 includes apertures 222 for bolts or other fasteners. Flange 220 provides a relatively large contact surface 224 (or other mounting features) to enable conductive cooling from shroud 206. In this example, contact surface 224 confronts a heat receiving (metal) surface of housing 116 (FIG. 1) so that heat is transferred from FC/A-to-bulkhead adapter 110 to housing 116, which acts as a heatsink for fan 150 (FIG. 1) to dissipate the excess heat.

Depending on the power specifications, FC/A-to-bulkhead adapter 110 may be milled from stainless steel, copper, or other thermally conductive materials (e.g., metal) to conduct away absorbed heat. In addition, conical reflector 216 is coated with a highly reflective metal, such as gold. More generally, any reflective surface treatments (gold, silver, dielectric coatings, mirror surface polish, or the like) may be used to reduce absorbed power that would heat the apparatus to dangerous temperatures. In some embodiments, conical reflector 216 has a rough surface finish that acts to reduce specular reflection by diffusing light.

Figure 3:
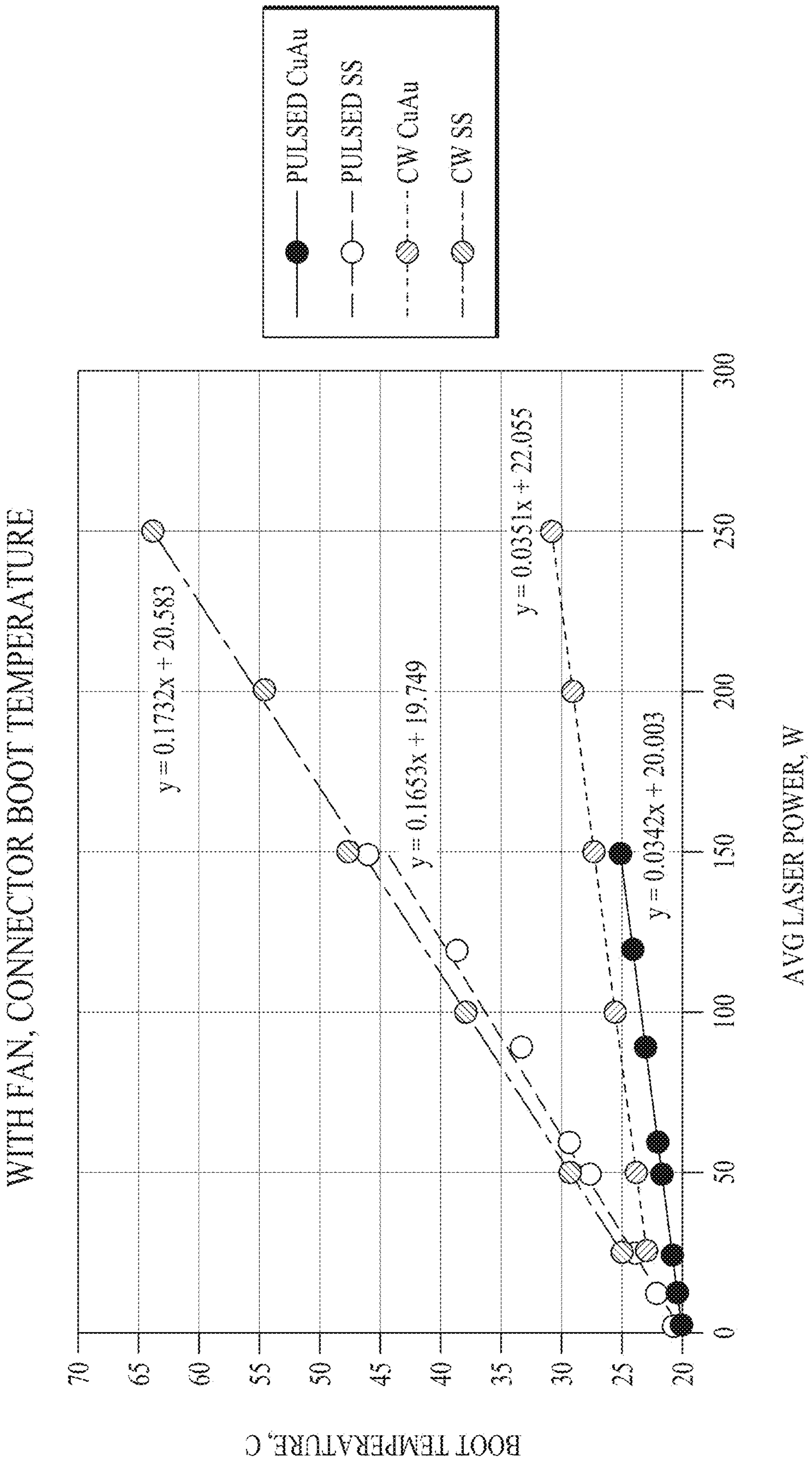
FIG. 3 is a line chart comparing temperatures of stainless steel and gold-plated copper FC/A-to-bulkhead adapter versions operating in pulsed and CW modes.
Figure 4:
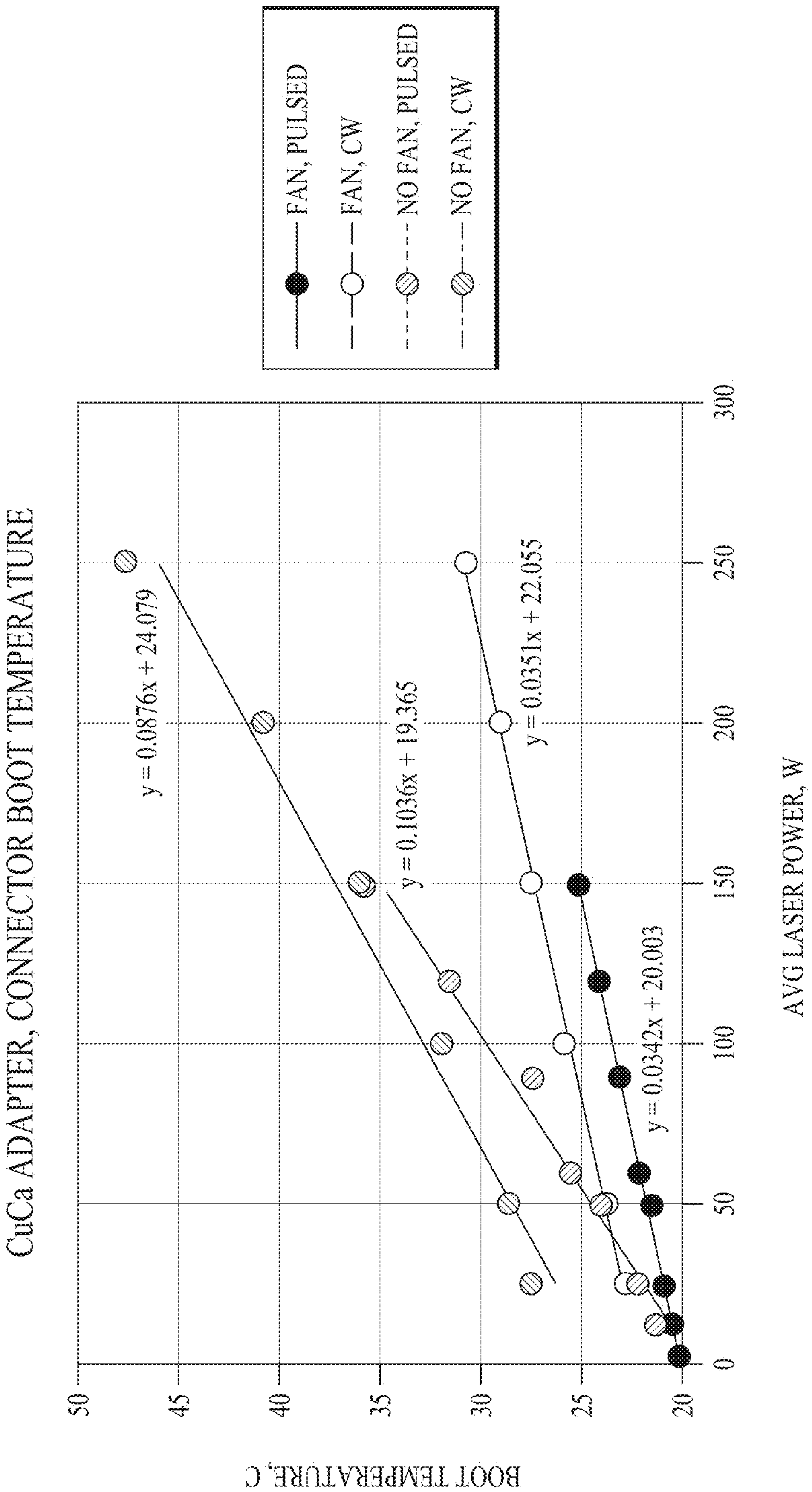
FIG. 4 is a line chart comparing temperatures with and without a fan cooling the gold-plated coper FC/A-to-bulkhead adapter version operating in pulsed and CW modes.

FIG. 3 and FIG. 4 show line charts of temperatures of boot 152 for different configurations as a function of laser power. For instance, FIG. 3 shows a comparison between stainless steel and gold-coated copper FC/A-to-bulkhead adapter 110. FC/A-to-bulkhead adapter 110 heat rate with Au plated Cu is reduced by about 5× compared to stainless steel. The temperature at 250 W appears well controlled for reliable long-term operation.

FIG. 4 shows the gold-coated copper FC/A-to-bulkhead adapter 110 with and without fan 150 cooling. FC/A-to-bulkhead adapter 110 heat rate with Au plated Cu without fan is about 3× higher than with fan. After 20 minutes, without fan, at 250 W connector temperature greater than 60° C. Operation with some cooling is suitable at average powers greater 100 W.

Figure 5:
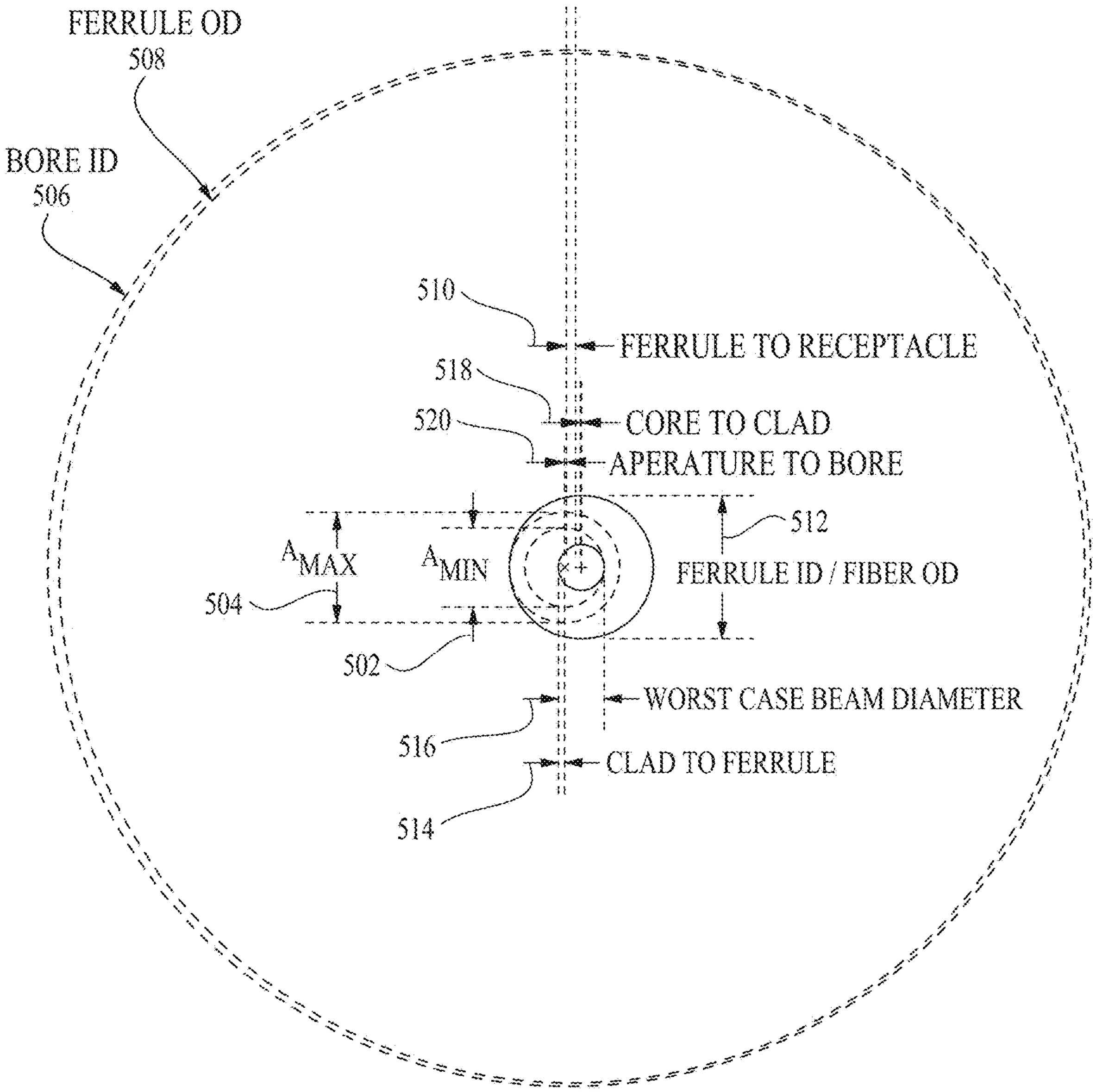
FIG. 5 is a front elevation section view taken along lines 5-5 of FIG. 2, showing positional tolerances of a bore, ferrule, and optical fiber components centrally located in the FC/A-to-bulkhead adapter.

FIG. 5 shows an example of minimum and maximum diameters of aperture 214, $A_{min}$ 502 and $A_{max}$ 504, which are designed to accommodate the stack-up of tolerances in the positioning of the various components described previously with reference to FIG. 2. For instance, FIG. 5 illustrates how ferrule bore 212 has an inside diameter (ID) 506 of 2.510 mm that confronts fiber ferrule 210 having an outside diameter (OD) 508 of 2.494 mm. Ferrule OD 508 is smaller than bore ID 506, resulting in a first tolerance dimension of 0.020 mm shown as ferrule to receptacle 510. Fiber ferrule 210 has an ID 512 of 0.365 mm that confronts cladding 226 having an OD (not shown) of 0.350 mm, resulting in a second tolerance dimension of 0.015 mm shown as clad to ferrule 514. Within the fiber itself, a worst case beam diameter 516 is 0.1100 mm (i.e., the beam diameter at the aperture exit, with core diameter of 75 microns and its desired beam properties) and there is a third tolerance dimension of 0.0025 mm shown as core to clad 518. The term worst case is used because beam characteristics vary, and so does the spacing from the end of the fiber to the aperture. After taking the variation and spacing variation into account, the worst case is the largest spot expected from which there is no clipping of power.

Finally, there is a machine tolerance in terms of positioning aperture 214 in the center of ferrule bore 212, resulting in a fourth tolerance dimension of 0.005 mm. After accounting for the maximum and minimum stack of tolerances, $A_{max}$ 504 is about 0.2700 mm and $A_{min}$ 502 is about 0.1950 mm. This equates to an aperture size that is about 1.77 to about 2.45 times larger than worst case beam diameter 516. Skilled persons would appreciate in light of this example that other sizes are also possible, depending on the fiber and the tolerances. For instance, the core may have a diameter of 500 micrometers, in which case the size of aperture 214 is scaled accordingly.

Figure 6:
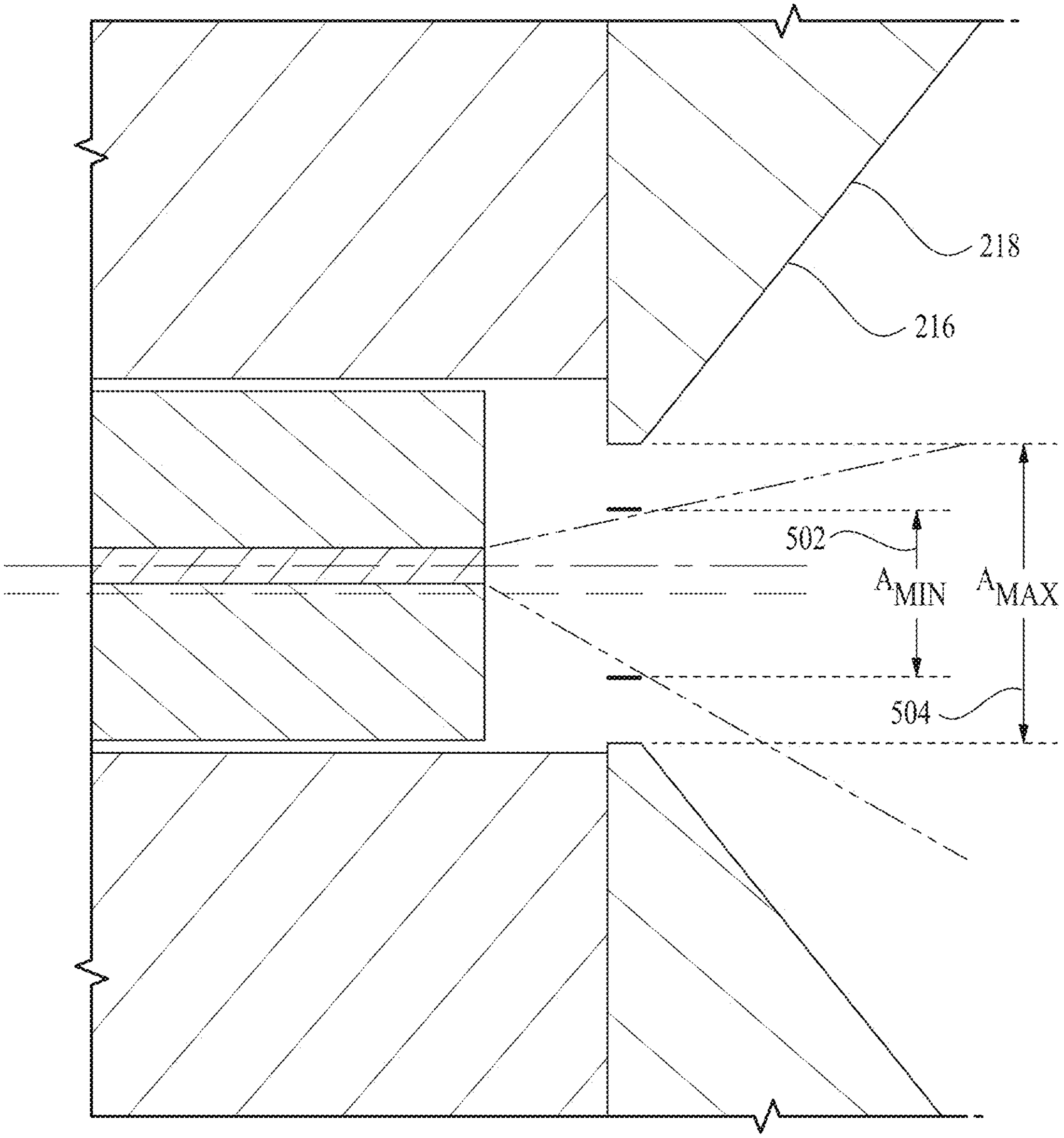
FIG. 6 is an enlarged side elevation view of the end face shown in FIG. 2, showing in greater detail the minimum and maximum aperture sizes.

FIG. 6 shows a side view of $A_{min}$ 502 and $A_{max}$ 504 when TFL output fiber 102 is at its maximum central alignment tolerance. This tolerance is represented by the aperture axis (in dashed lines) being displaced from the fiber core axis.

$A_{min}$ 502, which is centered about the aperture axis, does not clip the beam while $A_{max}$ 504 still shrouds all the material beyond the cladding. $A_{max}$ 504 is less than the cladding diameter due to the tolerances. Thus, the bottom of the shroud is aligned with the bottom of the cladding whereas the top of the shroud covers a portion of the cladding.

To prevent light that reflects from the connection interface from traveling back up the fiber, the fiber end face is polished at an angle so that the reflected light does not stay in the fiber core but instead leaks out into the cladding. Accordingly, FC/A receptacles are designed to maintain a small mechanical angle (e.g., 4°) to compensate for a refraction angle of the output beam emitted from the angled end face.

Figure 7:
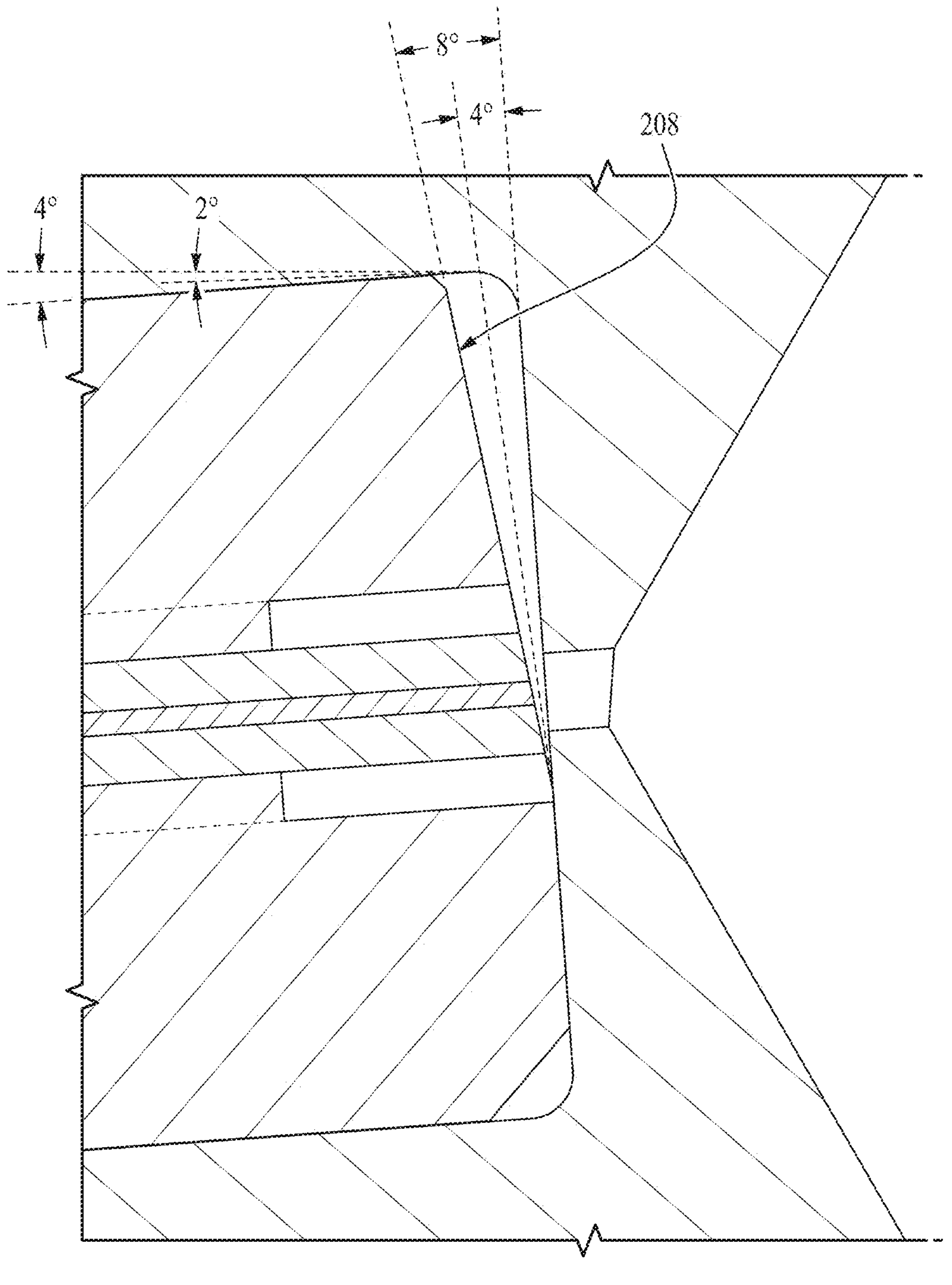
FIG. 7 is another enlarged side elevation view of the end face shown in FIG. 2, showing in greater detail an angled end face with first and second examples for amounts of angle.

FIG. 7 shows in greater detail end face 208 with an 8° angle. In this version FC/A-to-bulkhead adapter 110 (and fiber axis) has a 4° mechanical angle such that light refracts along an optical axis of FFC 118, with the optical axis being perpendicular to the plane of mounting base 114. At the air interface, however, some of the light is reflected back toward the fiber.

To control for the optical power that is reflected, different angled faces are possible. For instance, shown in phantom lines on FIG. 7 is a 4° angle, which is associated with a 2° mechanical angle so that the light refracts along the optical axis. The following paragraphs describing FIG. 8-FIG. 12 compare the amount of light that is reflected with the 8° angle and the 4° angle. Other angles of end face 208 are also possible. In other words, if the fiber were of another material that is not silica, the relationship between the angles would be different. For example, a chalcogenide fiber for longer wavelengths would have a different angle.

Figure 8:
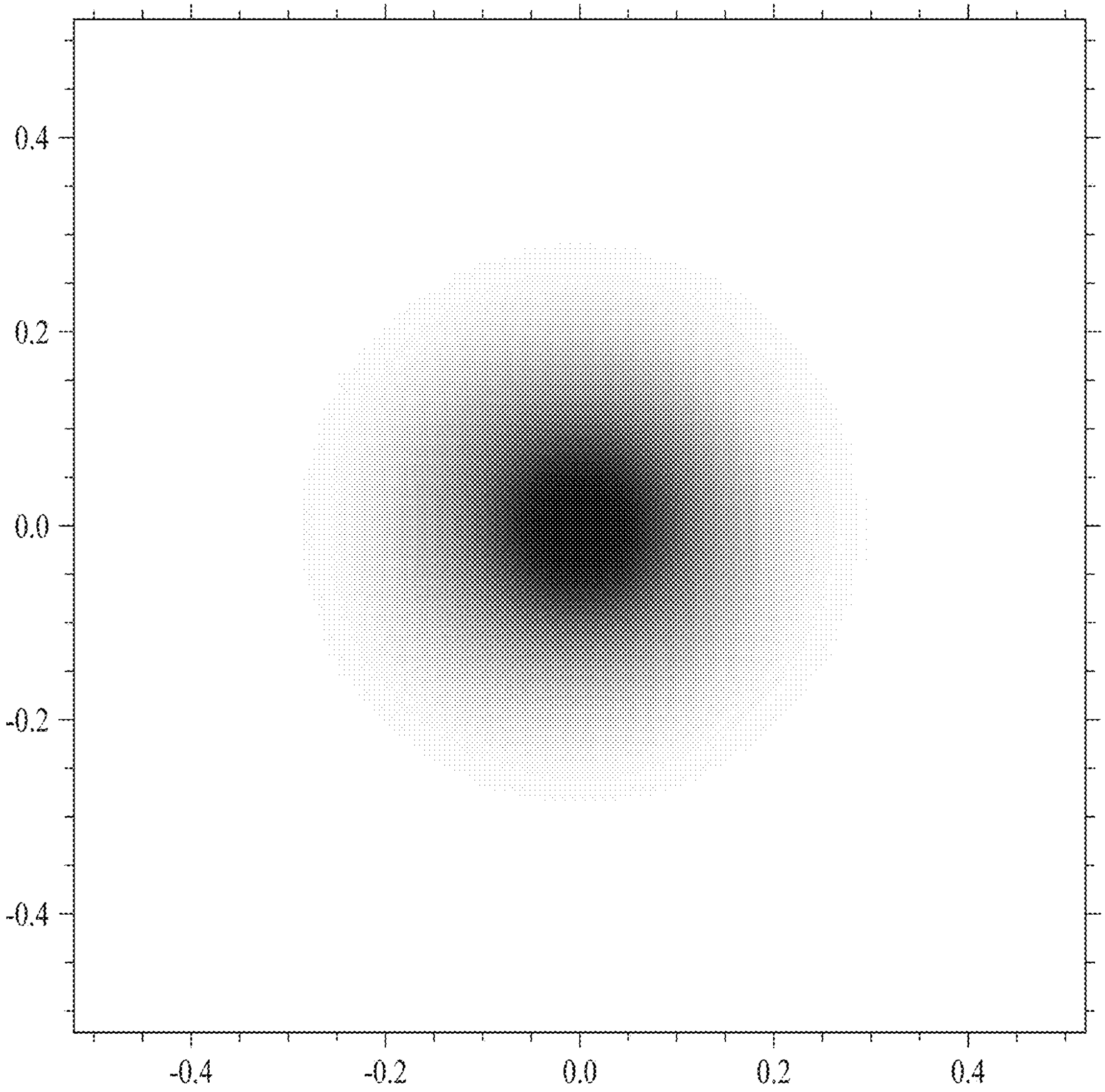
FIG. 8 is an intensity distribution diagram showing the laser intensity emitted from the core shown in FIG. 2.

Initially, FIG. 8 shows the spatial distribution (in radians) of light exiting fiber core 228. In this example, the spatial distribution is a Gaussian distribution that is centered with fiber core 228.

Figure 9B:
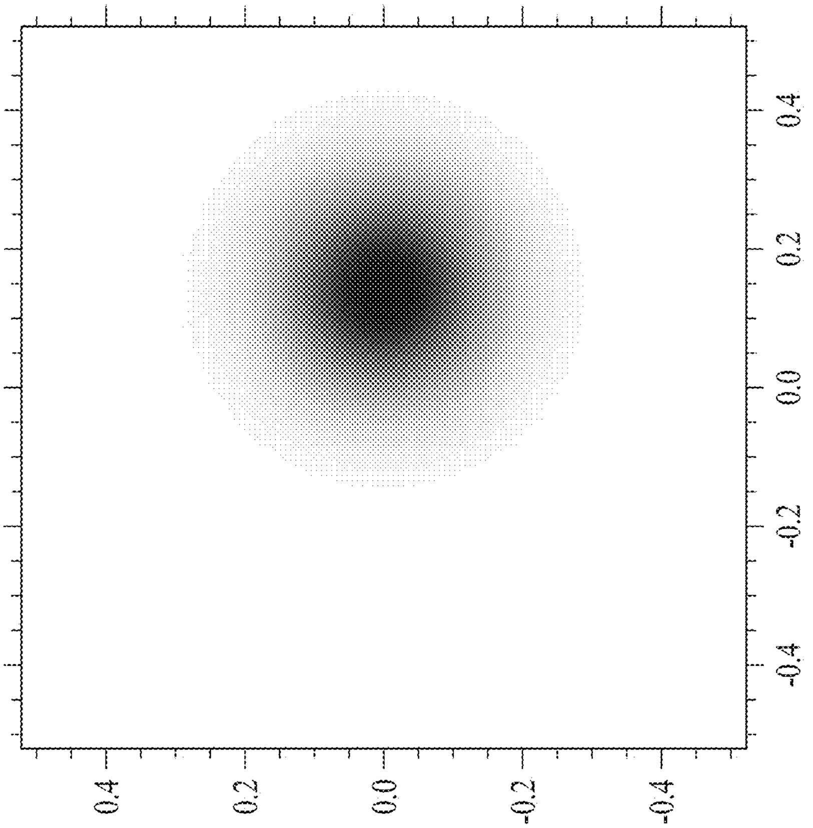
FIG. 9A and FIG. 9B are intensity distribution diagrams showing reflected laser intensity from, respectively, 8° and 4° angled end faces.
Figure 9A:
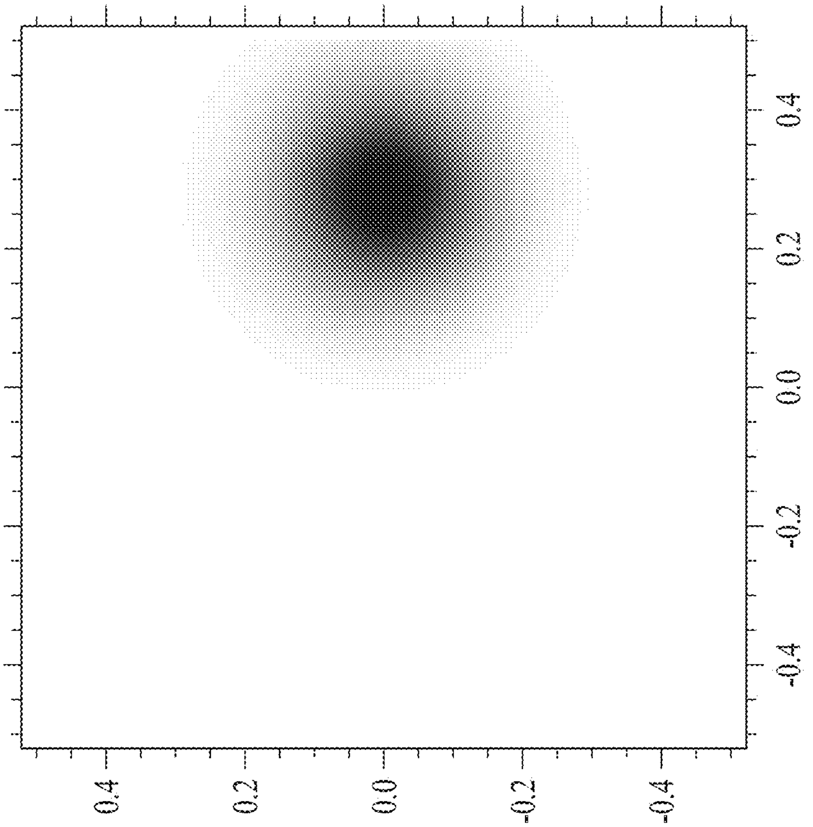

FIG. 9A shows the spatial distribution after an 8° angle reflection. Because of the angle, the center of the Gaussian distribution is shifted by about 0.3 radians. In contrast, FIG. 9B shows the center is shifted by about 0.15 radians for the 4° angle reflection.

Figure 10A:
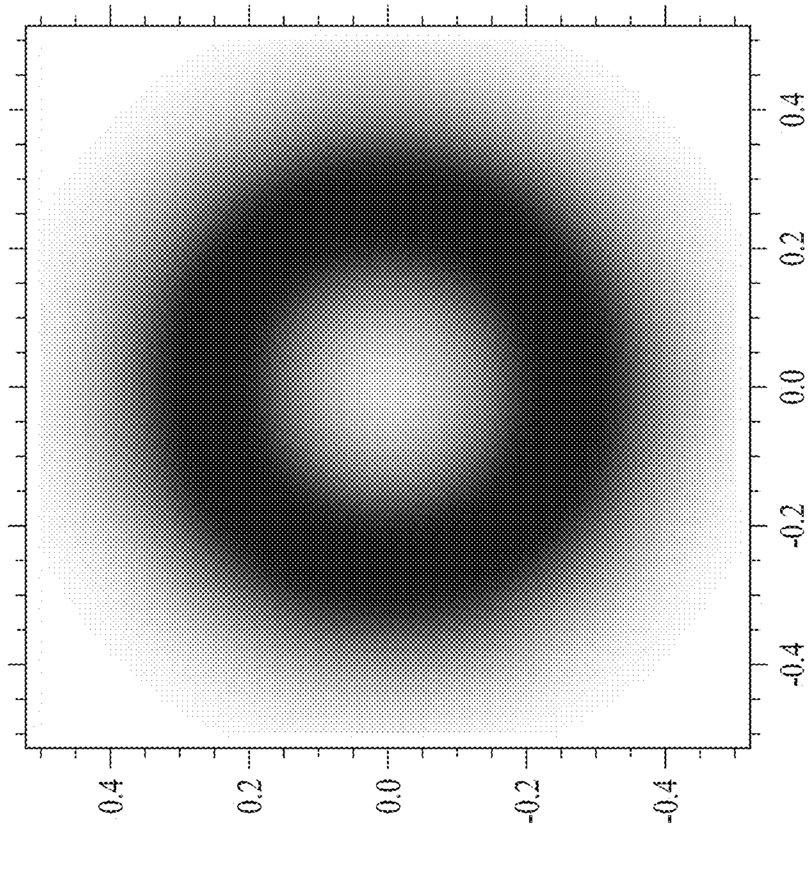
FIG. 10A and FIG. 10B are intensity distribution diagrams showing reflected laser intensity from, respectively, 8° and 4° angled end faces after it has propagated along the fiber.
Figure 10B:
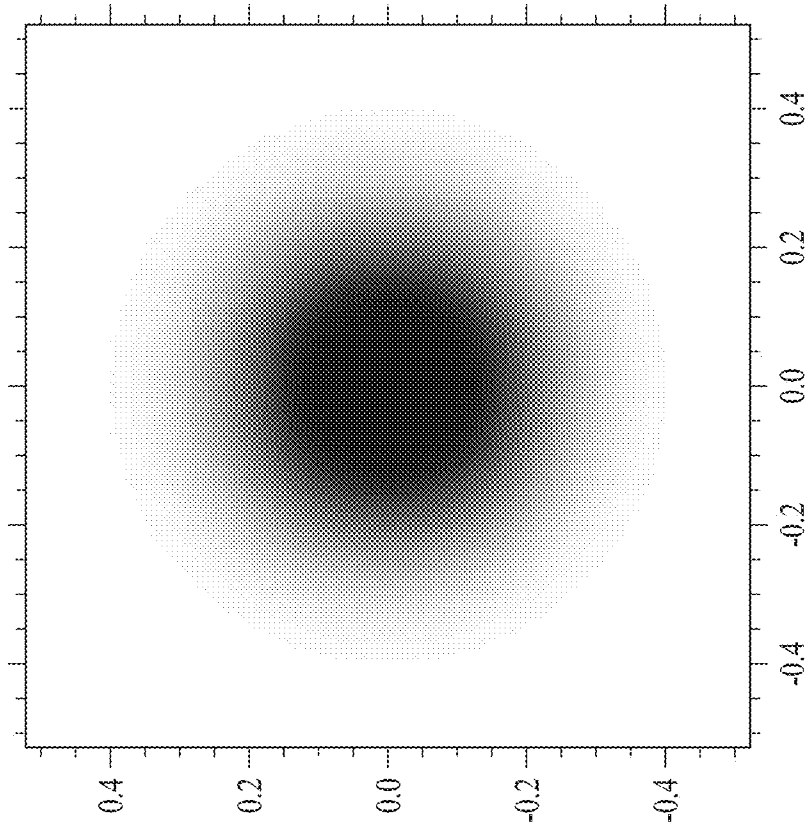

FIG. 10A shows the distribution of FIG. 9A after propagation down a long length of fiber. Likewise, FIG. 10B shows the distribution for FIG. 9B. The plots are distributions of the angles of propagation inside the fiber. The laser sends light almost all straight down the fiber as in FIG. 8. After reflection, the light in the fiber is reflected at an angle that is two times the incidence angle as in FIG. 9A and FIG. 9B. After propagation, the light continuous to propagate mostly at that reflection angle relative to the fiber axis, but spreads to all azimuthal angles. The 16° reflection from 8° end face is large so there is no propagation left on axis, which appears as a central void in FIG. 9A after the reflected light spreads in all azimuthal directions.

Figure 11:
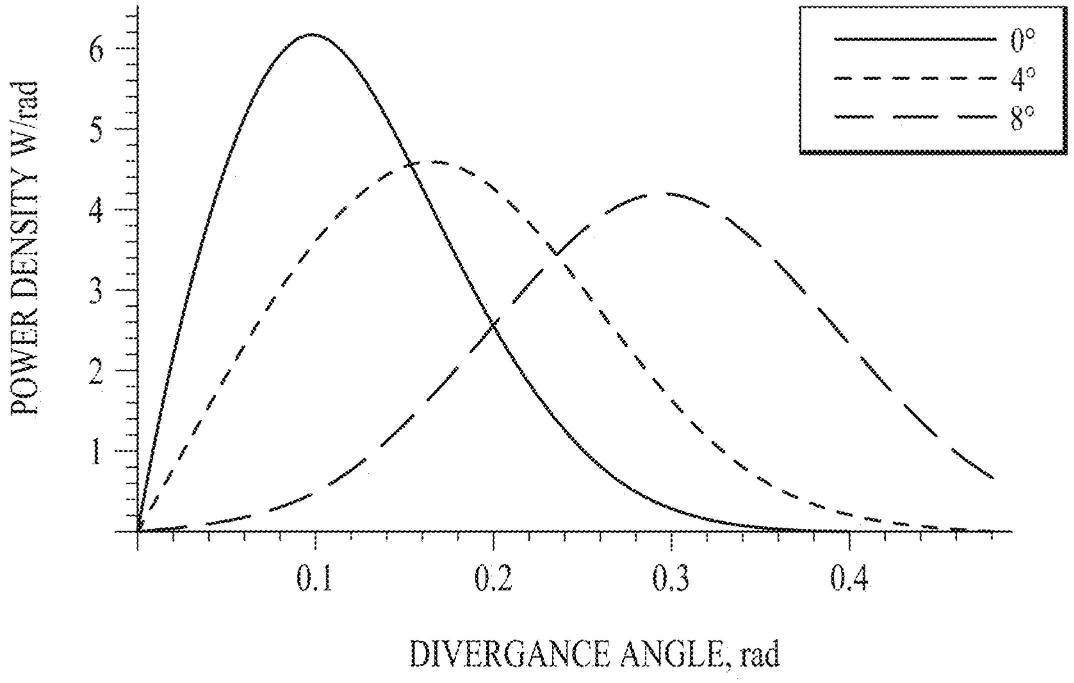
FIG. 11 is a radial power distribution showing three different options for angles of the end face.

FIG. 11 shows a comparison of three possibilities for radial power distributions based on different angles of end faces. The 8° distribution is cut-off significantly at the 0.48 numerical aperture limit, which is also a typical limit for guidance in a double clad fiber. The cut-off tail end represent power that appears as heat in the fiber coating.

Figure 12:
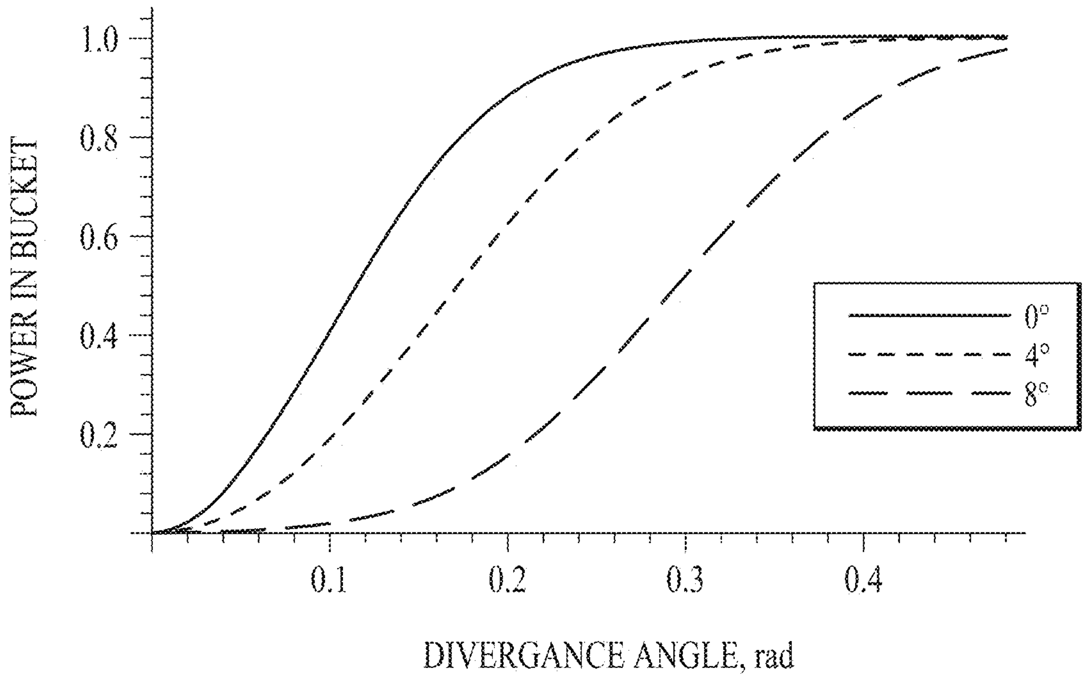
FIG. 12 is a power in the bucket diagram for the distributions of FIG. 11.

FIG. 12 shows a comparison of power in the bucket for the three distributions. The 0° and 4° distributions have 100% of their power within the 0.48 limit, but at 8° a few percent escapes as heat.

Having described and illustrated the general principles of examples of the presently disclosed technology, it should be apparent that the examples may be modified in arrangement and detail without departing from such principles. Skilled persons, therefore, will appreciate that many changes may be made to the details of the above-described embodiments without departing from the underlying principles of the invention. The scope of the present invention should, therefore, be determined only by the following claims.

What is claimed is:

1. A fiber connector bulkhead adapter for coupling a fiber connector to bulkhead optics so as to inhibit back reflections from damaging a laser system, the adapter comprising:

a bore sized to receive a fiber ferrule of a fiber connector, the fiber ferrule for holding an optical fiber, the optical fiber having a core and a cladding at an end face of the fiber ferrule, and the end face having at least a portion that confronts an end of the bore;

a mounting base defining a shroud; and an aperture in the shroud, wherein the aperture having has a diameter that is sized such that it does not occlude a beam diameter of a beam emitted from the core when the core is positioned at a maximum central alignment tolerance, wherein the shroud shrouds areas of the fiber ferrule beyond the cladding, and wherein the optical fiber has a fiber end face polished at a fiber end face angle with respect to a fiber axis of the optical fiber so that reflected light leaks out into the cladding.

2. The fiber connector bulkhead adapter of claim 1, in which the shroud is formed from a depressed region in the mounting base.

3. The fiber connector bulkhead adapter of claim 2, further comprising the shroud having a conical reflector.

4. The fiber connector bulkhead adapter of claim 3, in which the conical reflector has oblique-angled sidewalls to avoid corner-cube reflectance.

5. The fiber connector bulkhead adapter of claim 3, in which the conical reflector includes a surface treatment to reduce absorbed power.

6. The fiber connector bulkhead adapter of claim 5, in which the surface treatment is a gold plating.

7. The fiber connector bulkhead adapter of claim 5, in which the surface treatment is a surface texture to diffuse reflected light.

8. The fiber connector bulkhead adapter of claim 1, further comprising an adapter angle to set the emission perpendicular to the mounting base.

9. The fiber connector bulkhead adapter of claim 1, in which the mounting base includes a flange that acts as a heat sink for transferring heat to a bulk optics housing.

10. The fiber connector bulkhead adapter of claim 9, in which the heat sink is copper.

11. The fiber connector bulkhead adapter of claim 1, in which the fiber is a TFL optical fiber.

12. A method of reducing heat build-up in a laser system, the method comprising:

mounting the fiber connector bulkhead adapter of claim 1 to a housing of an FFC; and coupling the fiber connector to the fiber connector bulkhead adapter.

13. The method of claim 12, further comprising directing a fan toward the housing and the fiber connector bulkhead adapter.

14. The method of claim 12, further comprising actuating a liquid cooling system to cool the housing and the fiber connector bulkhead adapter.

* * * * *